UNITED STATES PATENT OFFICE.

BENJAMIN BATES, OF BALTIMORE, MARYLAND.

IMPROVEMENT IN THE MANUFACTURE OF BEER.

Specification forming part of Letters Patent No. 113,617, dated April 11, 1871; reissue No. 4,756, dated February 13, 1872.

DIVISION B.

*To all whom it may concern:*

Be it known that I, BENJAMIN BATES, of the city of Baltimore, in the State of Maryland, have invented a new and useful improvement, being a new article of ground or pulverized hops for use in the manufacture of all beers wherein hops form a component part, of which the following is a specification:

Hitherto in the manufacture of beer the hops have been used in their leafy condition by cooking or steeping them in the liquor. In the method heretofore practiced there are many disadvantages attending the use of hops. Pulverized hops for the purpose possess many advantages over hops in the leaf, because leaf hops, when subjected to a long boiling process in the beer-wort, produce a very material deterioration in their flavor; but a long boiling is necessary to extract the active principle from the leaf and bud of each hop. This difficulty has not hitherto been remedied. Moreover hops boiled in this condition are not, under long boiling even, divested of their active principle, and a larger quantity is, therefore, required to give the proper flavor and degree of strength to the liquor than is necessary under my process.

Hops, when reduced to powder, do not require near so much boiling, and the active principle is much more readily extracted than when in their leafy and clotted condition. Pulverized hops, however, soon part with the whole of the essence, by which a smaller quantity may be used, and under a much shorter period of boiling, so that under these two essential advantages I am enabled to obtain not only the full strength from the granular hops, but I accomplish this without injuring the flavor of the liquor.

In this way, also, the brewer can render the quality of the liquor uniform, as the ground hops can be kept with their full natural flavor for a long time, and the quantity for a given quantity of liquor more accurately determined. It is plain, therefore, that, as hops reduced to powder and used as such will, under a given weight, yield a much larger percentage of the active principle than leaf or bud hops, there must, necessarily, be a very material economy in using the hop powder over the leaf.

Another very great advantage in the use of powdered hops in the process of making all beers is that the hops so pulverized need not be subjected to the boiling at all, but simply treated with cold water, which will extract all the essence from the grains in a comparatively short time.

Having described my invention, I claim under this patent—

As an improvement in the process of making beer, the herein-described method of using hops—that is to say, in a ground or pulverized condition, as set forth.

BENJAMIN BATES.

Witnesses:
OSCAR D. BATES,
C. H. SLICER.